Figure 1:
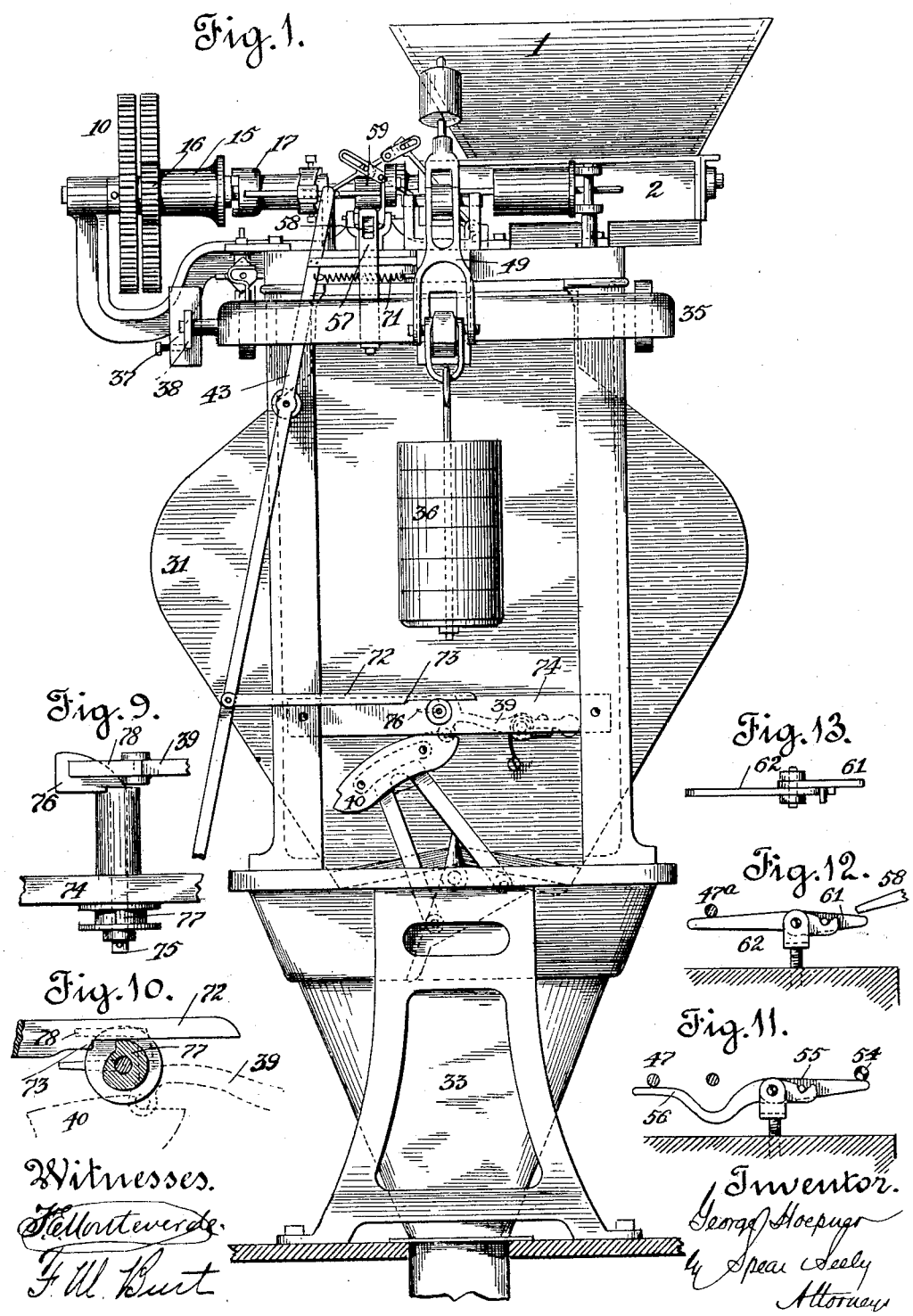

No. 749,194. PATENTED JAN. 12, 1904.
G. HOEPNER.
WEIGHING APPARATUS.
APPLICATION FILED NOV. 1, 1902.
NO MODEL. 5 SHEETS—SHEET 1.

No. 749,194. PATENTED JAN. 12, 1904.
G. HOEPNER.
WEIGHING APPARATUS.
APPLICATION FILED NOV. 1, 1902.
NO MODEL. 5 SHEETS—SHEET 4.
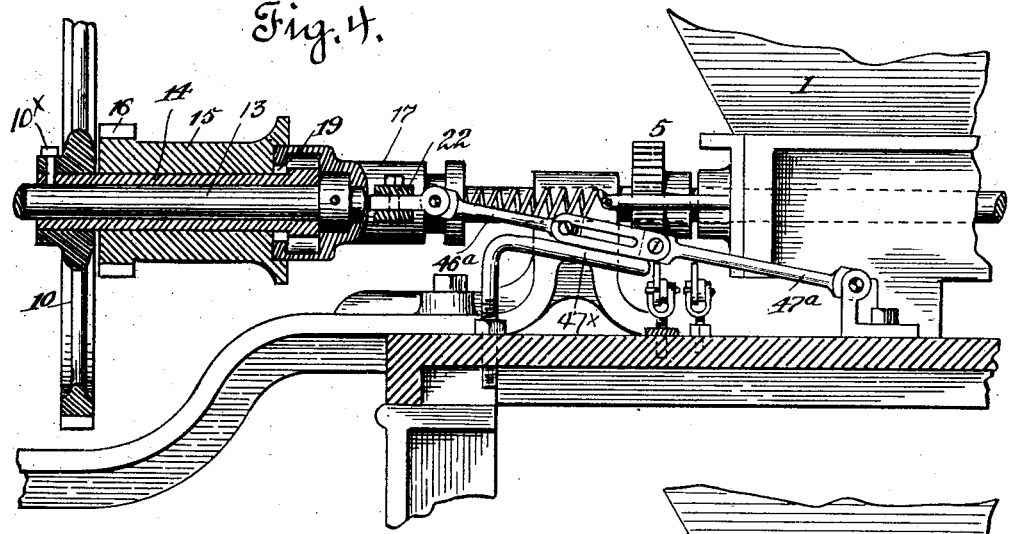
Fig. 4.
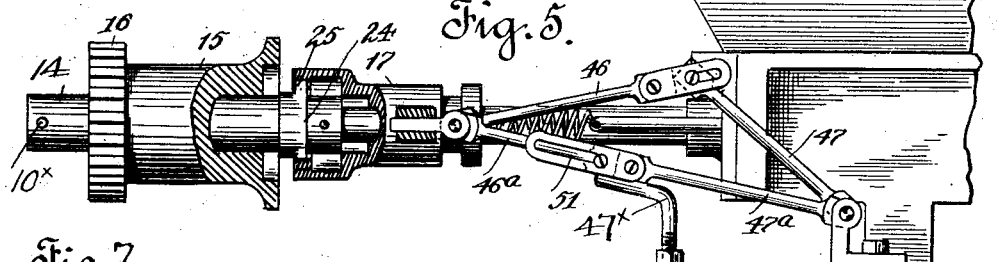
Fig. 5.
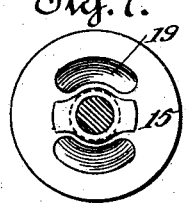
Fig. 7.
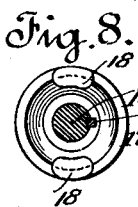
Fig. 8.
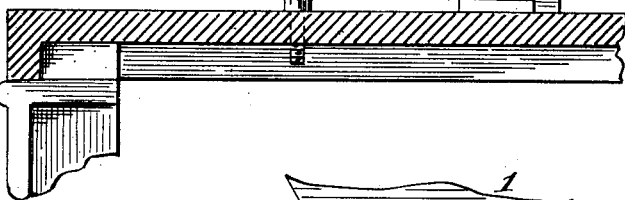
Fig. 6.
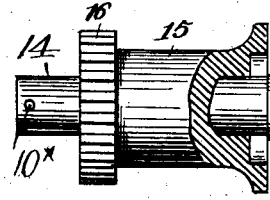
Witnesses.
Inventor.
George Hoepner
by Spear Seely Attorneys No. 749,194. PATENTED JAN. 12, 1904.
G. HOEPNER.
WEIGHING APPARATUS.
APPLICATION FILED NOV. 1, 1902.
NO MODEL. 5 SHEETS—SHEET 5.
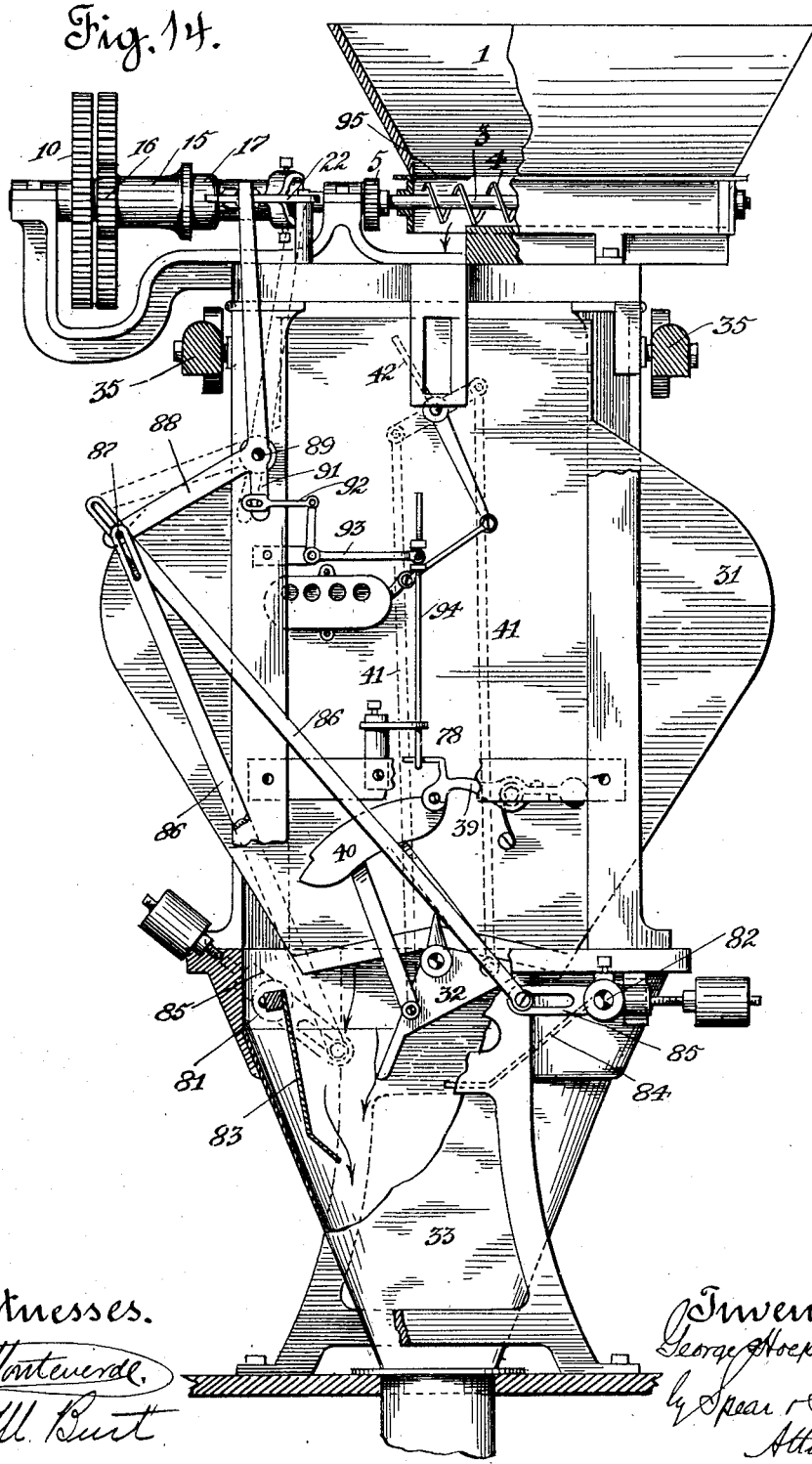

No. 749,194. Patented January 12, 1904.

UNITED STATES PATENT OFFICE.

GEORGE HOEPNER, OF SAN FRANCISCO, CALIFORNIA, ASSIGNOR TO UNION SCALE AND MANUFACTURING COMPANY, OF SAN FRANCISCO, CALIFORNIA, A CORPORATION OF CALIFORNIA.

WEIGHING APPARATUS.

SPECIFICATION forming part of Letters Patent No. 749,194, dated January 12, 1904.

Application filed November 1, 1902. Serial No. 129,713. (No model.)

*To all whom it may concern:*

Be it known that I, GEORGE HOEPNER, a citizen of the United States, residing at San Francisco, in the county of San Francisco and State of California, have invented certain new and useful Improvements in Weighing Apparatus, of which the following is a specification.

My invention relates to apparatus for weighing and discharging regulated quantities of material in successive charges. For some kinds of material weighing-machines are now in use which feed, weigh, and discharge with great accuracy. These are dry substances which flow freely—such as grain, granulated sugar, rice, &c. The separate particles or grains of materials like those mentioned have practically no adhesiveness and as they flow freely are easily controlled. This makes it practicable to employ gravity-feed and to use gates, cut-offs, and valves, because the current of material always responds quickly to the opening of such controlling devices. There are some materials, however, whose nature makes it impracticable to employ a gravity-feed and secure accurate results in weighing or to control the feed by the use of valves, cut-offs, &c. These are substances of a cohesive nature—such as pulverized oil-cake, flour, or fine meal. If gates are employed, their action is liable to be clogged, and if a gravity-feed is relied upon the tendency of the material to bridge by cohesion prevents certainty in supplying the weighing-machine and accuracy in its operation.

The object of my invention is to provide the weighing mechanism with a positive force-feed, which shall render the operation of the machine independent of the causes above referred to as producing inaccurate results. Further, to provide a multiple force-feed, so as to produce a great area of agitation and to handle large quantities of material when necessary. Further, and as having reference to a fluctuating rate of supply from elevators, &c., to provide a force-feed of variable speeds, delivering the bulk of a charge at high speed and completing the weight at lower speed with reduced quantity. Further, to provide means for automatically controlling the speed of the force-feed. A practical embodiment of my invention by which these objects are accomplished is shown in the accompanying drawings, in which—

Figure 2:
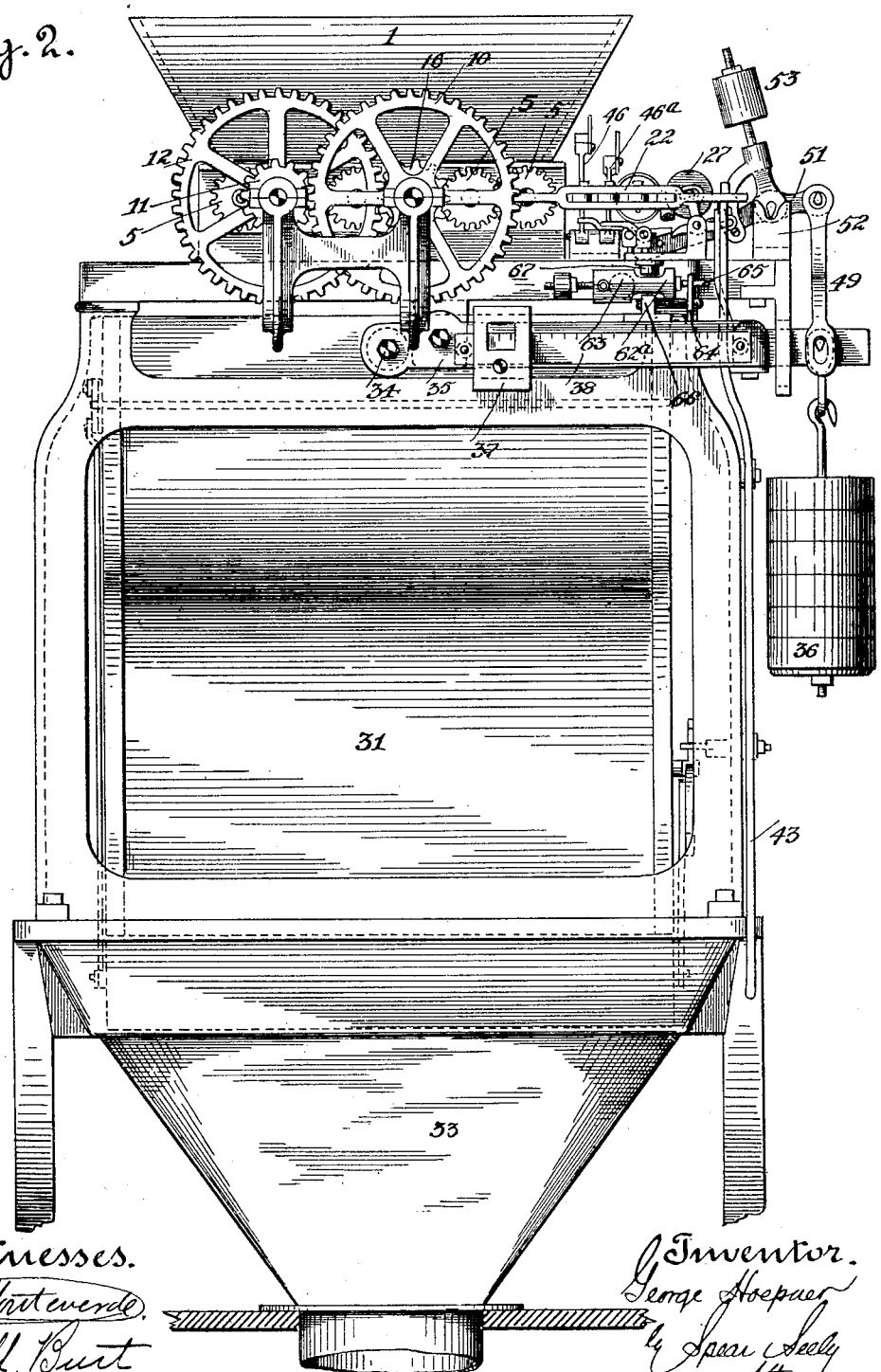
Figure 3:
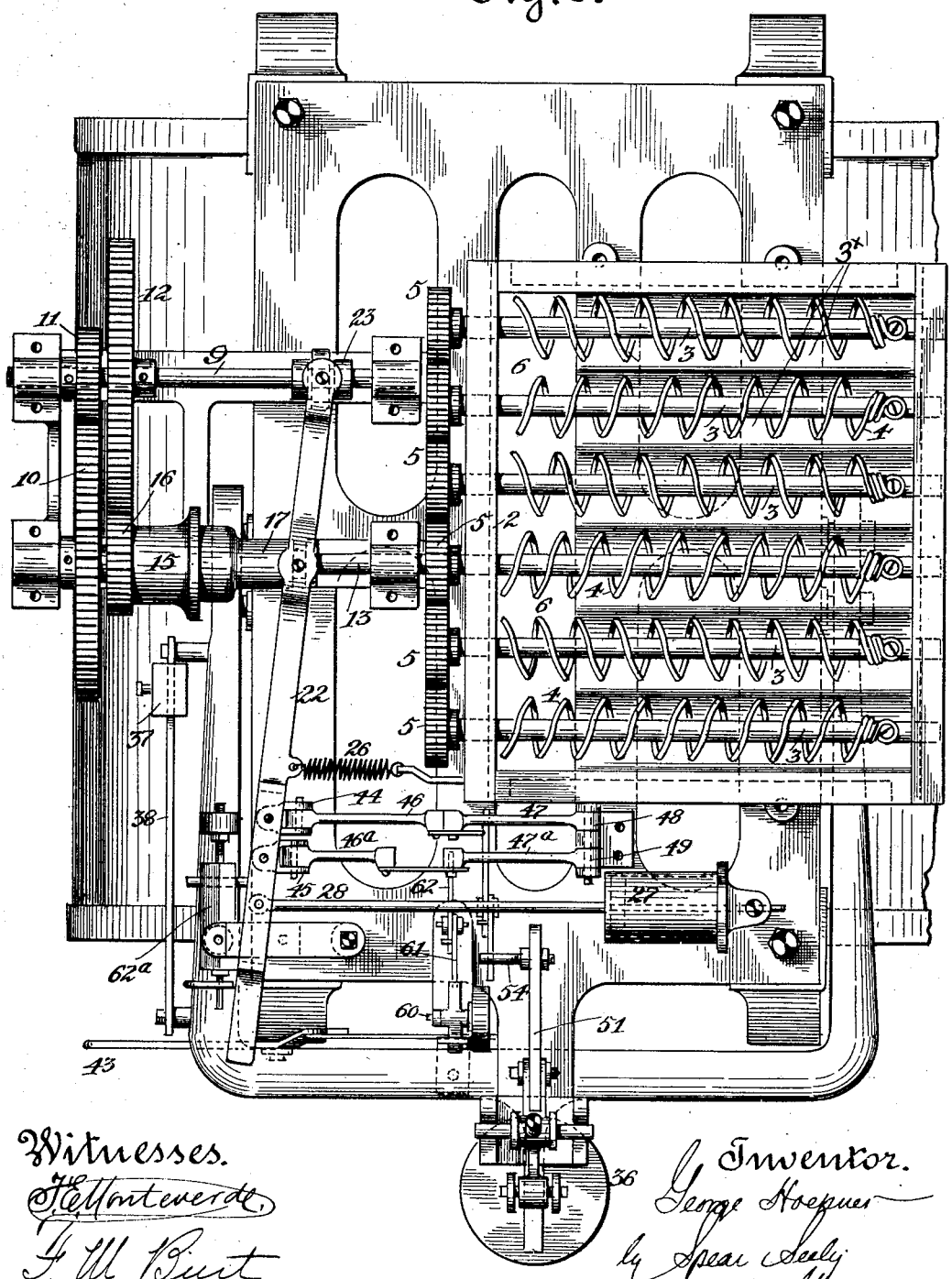

Figure 1 is a side elevation of the whole machine. Fig. 2 is a front elevation. Fig. 3 is a plan view of the force-feed and related parts with feed-hopper removed. Fig. 4 is a detailed side elevation, partly in section, of the connections between the driving means and the feed for controlling the speed of the latter, the position being that of high speed. Fig. 5 is a similar view at low speed. Fig. 6 is a similar view with driving mechanism out of gear and machine stopped. Figs. 7 and 8 are detail views of parts shown in Fig. 5. Fig. 9 is a plan view of means for controlling the weighing-bucket in its connection with the differential speed force-feed. Fig. 10 is a sectional side elevation of the same parts. Fig. 11 is a side elevation of the levers for breaking the joint of the high-speed knee-levers. Fig. 12 is a similar elevation of the means for breaking the joints of the low-speed knee-levers. Fig. 13 is a plan view of the same. Fig. 14 is an elevation showing the means for automatically reëngaging the clutch with the high-speed feed.

Referring first to Figs. 1 and 2, the numeral 1 represents a hopper into which the material to be weighed is fed in any suitable manner. The hopper has an open bottom and discharges freely into a receptacle 2, Fig. 3, divided into a series of troughs $3^\times$, which troughs contain the multiple force-feed which supplies the weighing-bucket. The feed within this receptacle comprises a number of parallel shafts 3, each of which carries a spiral conveyer 4. These conveyers might be solid flights; but I prefer to use the construction shown, in which the conveyers are stiff wire coiled loosely around each shaft and secured thereto near one end with the other end preferably left free. The shafts project through the wall of the receptacle and are geared together by pinions 5. The shafts are consequently revolved alternately in opposite directions, and hence to secure the proper feeding motions for the conveyers they are coiled alternately in opposite directions around said shafts. Thus they feed material supplied to them in mass uniformly in the same direction, (to the left in Fig. 3,) agitating and breaking up said material, preventing it from cohering and adhering, and delivering it into an opening 6 in said receptacle, through which it escapes to the weighing-bucket. The driving of these shafts is well illustrated in Fig. 3; but reference must be made to Figs. 4, 5, 6, 7, 8 as well. The feed derives its motion from a shaft 9, Fig. 3, connected to any suitable power-shaft in some convenient way. This shaft 9 carries pinion 11 and gear 12. A second shaft 13 carries one of the series of pinions 5. Shaft 13 has a loose sleeve 14, carrying a gear 10, connected thereto by a set-screw $10^\times$, meshing with pinion 11 and has a sleeve 15 with pinion 16, the latter meshing with a gear 12 of shaft 9. The sleeve 15 is fixed upon shaft 13 and forms a member of a clutch device for changing the speed of and also for stopping the geared feed-shafts and conveyers. The sleeve 14 on shaft 13 takes the normal speed of the gear 10; but if such shaft is so connected as to take the speed of pinion 16 then the geared conveyers will rotate at a speed much in excess of the normal. On the shaft 13 is sliding clutch-sleeve 17, formed with lugs 18, Fig. 8, adapted to enter the face of sleeve 15 and engage with slots 19 therein, Figs. 4 and 7. This clutch-sleeve is movable on the shaft by a groove-and-feather connection 21, Fig. 8, and is operated by the lever 22, Fig. 3, pivoted thereto and also to a fixed collar 23 on shaft 9. Since the clutch 17 moves with shaft 13, it will when engaged, as in Fig. 4, with pinion 16 impart a relatively high speed to the conveyers. The sleeve 14 is, however, provided with a fixed collar 24, which revolves with it at normal speed and which has projections 25, capable of engaging the clutch 17, Fig. 5. There is a third position, Fig. 6, when the clutch 17 is withdrawn, so that no part of the shaft 13 engages any moving mechanism, and hence the shaft 13 and the geared conveyers remain stationary. A strong spring 26 is connected to lever 22 and tends to hold the clutch out of engagement, and this spring when the lever is released acts against a pneumatic resistance comprising a piston working within a cylinder 27 and having a piston-rod 28 connected to the lever, Fig. 3. This eases the motion and prevents shock and jar to the moving parts.

The invention so far as described provides for the constant feed of material to a multiple forcing device which agitates and stirs such material by working in and through it and which also positively forces such material to the opening through which it descends to the weighing-bucket. I proceed to describe the automatic arrangement by which the weighing-bucket controls the feed, its change in speed, and its cessation.

The weighing-bucket 31 is preferably formed with two compartments separated by a vertical partition. At its lower end is a hinged double bottom 32, Fig. 14, capable of being swung so as to open and close the two compartments alternately and so compel them to discharge successively through any suitable outlet, such as the funnel 33. The weighing-bucket is hung on pivots 34 from the yoke 35, which is the main scale-beam, and is counterpoised to the requisite extent by the main pea 36 and also by the auxiliary adjustable pea 37 on the notched bar 38, Fig. 2, which adjusts the machine to accurate fractions of whole amounts, (represented by pea 36.) At one end of the machine the swinging bottom is provided with a notched segment 40, with which engages the latch 39, pivoted on the bucket and having a roller at its free end adapted to engage and lock the bucket-bottom at both extremes of the swing of said segment. At the other end of the machine the bottom is connected by parallel rods 41 to a deflecting-gate 42. (Dotted lines in Fig. 14.) This gate swings with the movement of the bottoms across and beneath the outlet from the feed and automatically deflects the material into the closed compartment of the bucket.

The lever 22, which directly controls the clutch, is connected, Fig. 1, to a hand-lever 43, pivoted on the frame and extending downwardly into convenient reach. This lever is used for throwing in the clutch to full speed and starting the feed to the maximum capacity. This is the position of the clutch in Fig. 4. Afterward the position at slow speed, Fig. 5, and the position with stopped feed are made automatically. Hinged to the lever 22 are brackets 44 45, in which are pivoted knee-levers composed of two arms 46 47 $46^a$ $47^a$, jointed together and also hinged at 48 49 to the main frame. There is a slot-and-pin connection at the joints of each knee-lever; but the slot 51, between arms $46^a$ and $47^a$, is longer than the other, because the joint must be broken between the straightened arms 46 and 47 without breaking that between the arms $46^a$ and $47^a$. (Compare Figs. 4 and 5.) When the feed is at high speed, both levers are straight and hold the clutch to the high-speed engagement. If the joint between arms 46 and 47 is broken, the spring can act to partly release the clutch; but it will still be held at low speed by arms $46^a$ and $47^a$. When the joint between the latter is broken, the spring can act to its full capacity and the clutch will be entirely released. A rest $47^\times$ is provided for preventing the arms from breaking downward.

The successive breaking of the joints between the knee-levers is effected by the movements of the weighing-bucket under the influence of the charges admitted thereto.

Referring to Figs. 1, 2, and 3, it will be seen that a yoke 49 is pivoted to the main scale-beam and also to a rocking arm 51, hung in a bracket 52 on the frame. The arm 51 has a counterpoise 53. At the inner end of said arm is a projecting pin 54, which upon its descent strikes one of a pair of levers 55 56, mounted on the frame. Lever 55 has a pin which acts as the means for raising the farther end of lever 56, the latter projecting under and near the joint of the knee-levers 46 and 47. When a compartment of the bucket is filling and a sufficient quantity has entered, the weight of the material, combined with the momentum of the entering charge, lowers the bucket slightly, and thereby produces a corresponding upward movement of the scale-beam. This motion is connected, through the parts just described, to the levers which break the joint of the high-speed knee-levers, and the effect is rendered positive by the action of the counterpoise. As soon as the joint is broken the spring 26 acts sharply, withdrawing the clutch from its high-speed engagement; but the arms 46$^a$ and 47$^a$ still remain straight, although they slide upon one another for the length of the slot 51. This is the change in position illustrated by the comparison of Figs. 4 and 5, the result being that in Fig. 5 the clutch is in its low-speed engagement, which it will retain until the knee-joint which holds it is broken. During this low speed the feeding-conveyers continue to feed an additional quantity of material to be added to the nearly completed load until by such completion the weighing-bucket is enabled to descend to the full extent of which it is capable and to discharge the load. Simultaneously with this second descent the joint between the low-speed knee-levers is broken. This is occasioned by the farther upward movement of the scale-beam transmitted through a slotted arm 57, into whose slot projects the end of a lever 58, carrying a weight 59. This lever is pivoted at 60, Fig. 3, and when depressed operates two other levers, 61 and 62, the latter of which projects beneath the knee-lever 47$^a$. When this joint is broken, the parts assume the position of Fig. 6, with the clutch entirely disengaged and the feed stopped. A tilting ball-race 62$^a$, carrying the rolling ball 63, is provided, which operates as a sensitive stop for momentarily checking or easing the upward movement of the scale-beam and preventing any hammering. When the scale-beam descends, the ball-race is pulled down by the pins 64 65, Fig. 2, so that the ball travels to its front end between the stops or projections 66 and 67. As the scale-beam rises the pivoted race is released; but the ball in the act of sliding to what is now the lower end is touched by the stop 66, with the effect of easing the motion of the scale-beam, as before described. The touch is but momentary and is really taking place while the ball is in motion, and the latter immediately rolls to its normal position, which is that of Fig. 2, the scale-beam continuing to rise to break the low-speed knee-joint, as previously described.

After the final descent and return of the weighing-bucket and the cessation of the feed the machine can be started again by engaging the clutch, which is done by hand-lever. The hinged bottom of the bucket is positively unlocked by the release of the latch from the segment attached to such bottom, so that the weight of material shall cause one compartment to open and the other to close. Referring to Figs. 1, 9, and 10, it will be seen that the hand-lever, which throws the clutch into engagement and which is held in normal or ineffective position by the spring 71, Fig. 1, is hinged to an arm 72, having an offset or shoulder 73. Journaled in a bar 74 of the frame is a shaft 75, having at one end a lifter 76 and at the other a cam 77, upon which latter arm 72 rests, Figs. 9, 10. The latch has an arm 78 above the lifter. When the hand-lever is moved to throw in the clutch, the shoulder 73 strikes the cam and throws the lifter up against the latch, so as to release it and permit the weight of material in the other compartment to discharge such material and shift the bottom. I have heretofore assumed that after each sessation of the feed an operator would throw in the clutch by hand. I have, however, provided means for accomplishing this automatically and have illustrated such means in Fig. 14.

Within the funnel, into which the weighing-bucket discharges, are two rock-shafts 81 82, upon which are secured the deflecting-boards 83 84. Outside the machine each rock-shaft has a counterbalanced arm 85, slotted at its inner end and connected by such slot and a pin to the rods or links 86. Both links 86 have a slot connection with a pin 87 on the bell-crank 88, pivoted to the frame at 89, and the upper end of this bell-crank acts on the lever 22, which operates the clutch. The bell-crank has also a projection 91, connected by link 92 to a bell-crank 93, which is in turn connected to the rod 94. This rod takes below the hook or projecting arm 78 on the latch, which locks the bucket-bottom to the swinging segment. Consequently when the bucket discharges from either compartment the weight of material striking the deflecting-board will through the connections described throw in the clutch at full speed in order to fill the other compartment, and this operation will be indefinitely repeated. After each operation the weight of material in the other compartment will swing the segment, this being permitted by the positive release of such segment from the latch through the agency of the rod 94.

Since the supply of material from the main source is continuous, a guard 95, Fig. 14, is interposed above the outlet to the weighing-bucket, so that no material can pass from the feed while the latter is stopped.

I do not limit myself to the specific constructions described herein and shown in the accompanying drawings, as I desire to avail myself of such modifications and equivalents as fall properly within the spirit of my invention.

Having thus fully described my invention, what I claim as new, and desire to secure by Letters Patent, is—

1. In a weighing apparatus, a source of supply, a weighing mechanism, a compartment-receptacle between the source of supply and the weighing mechanism and in communication with both and a series of coiled-wire conveyers in said compartments.

2. In a weighing-machine, a force-feed conveyer for material comprising a rotary shaft, and a wire secured to said shaft and coiled spirally around it.

3. In a weighing-machine, a multiple force-feed comprising a series of rotary shafts geared together, and rods coiled spirally and oppositely around such shafts, whereby material fed in bulk to the series is forced in the same direction by all of said conveyers.

4. In a weighing apparatus, a vertically-movable weighing-bucket, a source of supply, a force-feed between the two, means including a shifting clutch for driving the force-feed, a clutch-lever, a pair of knee-jointed rods pivoted to the frame of the machine, and to the clutch-lever, a spring connected to the clutch-lever and tending to release the clutch, connections whereby a partial descent of the bucket breaks one knee-joint and permits the clutch to partly shift, and connections operated by the complete descent of said bucket for breaking the other knee-joint and permitting the complete release of the clutch.

5. In a weighing apparatus, a source of supply, a weighing-bucket, a force-feed between the two, means including a clutch and its lever for driving the force-feed at different speeds, means for holding the clutch in engagement with the driving means, a spring tending to release the clutch, and a pneumatic resistance to said spring operable when the clutch-lever has been released and the spring permitted to act.

6. In a weighing-machine, a multiple force-feed comprising a series of parallel shafts geared together so as to rotate alternately in opposite directions, and conveyers arranged in alternately opposing spirals on said rods, whereby material fed to said conveyers is forced in the same direction by all of said conveyers and change-speed gearing for driving the said conveyers.

7. In a weighing-machine, a multiple force-feed, comprising a series of parallel shafts geared together so as to rotate alternately in opposite directions, and coiled-wire conveyers arranged in alternately opposing spirals on said rods, whereby material fed to said conveyers is forced in the same direction by all of said conveyers.

8. In a weighing apparatus, a weighing-bucket, a source of supply, a differential force-feed connected thereto, means operated by the weighing-bucket for controlling the speed of the feed from high speed through an intermediate speed, to cessation, and a lever operated by the discharge of material from the weighing-bucket for setting the differential force-feed at high speed.

9. In a weighing apparatus, a source of supply, a differential force-feed, a compartment weighing-bucket supplied by said force-feed, a scale from which said bucket is hung, a power-shaft, a clutch controlled by the weighing-bucket for changing the speed of the feed, and a pivoted ball-race and rolling ball acting as a temporary stop to the upward movement of the scale-beam after the discharge of a load from either compartment of the bucket.

In testimony whereof I have affixed my signature, in presence of two witnesses, this 18th day of September, 1902.

GEORGE HOEPNER.

Witnesses:
L. W. SEELY,
F. M. BURT.